(12) United States Patent
Jongsma et al.

(10) Patent No.: US 6,768,894 B2
(45) Date of Patent: *Jul. 27, 2004

(54) COMPUTERIZED SYSTEM AND METHOD FOR TEACHING AND ASSESSING THE HOLISTIC SCORING OF OPEN-ENDED QUESTIONS

(75) Inventors: Eugene A. Jongsma, San Antonio, TX (US); David K. Mellott, San Antonio, TX (US)

(73) Assignee: Harcourt Assessment, Inc., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/316,135

(22) Filed: Dec. 10, 2002

(65) Prior Publication Data

US 2003/0165804 A1 Sep. 4, 2003

Related U.S. Application Data

(63) Continuation of application No. 09/624,444, filed on Jul. 24, 2000, now Pat. No. 6,493,536, which is a continuation of application No. 08/986,022, filed on Dec. 5, 1997, now Pat. No. 6,267,601.

(51) Int. Cl.[7] ............................................. G09B 7/00
(52) U.S. Cl. ....................... 434/353; 434/327; 434/323; 434/362; 434/350; 434/118
(58) Field of Search ................................ 434/353, 327, 434/323, 362, 118, 350; 345/705, 706, 707, 708, 709

(56) References Cited

U.S. PATENT DOCUMENTS

| | | | |
|---|---|---|---|
| 4,862,390 A | * | 8/1989 | Weiner .................... 345/822 X |
| 4,958,284 A | | 9/1990 | Bishop et al. |
| 5,035,625 A | | 7/1991 | Munson et al. |
| 5,059,127 A | | 10/1991 | Lewis et al. |
| 5,259,766 A | | 11/1993 | Sack et al. |
| 5,321,611 A | | 6/1994 | Clark et al. |
| 5,395,243 A | * | 3/1995 | Lubin et al. ............ 434/118 X |
| 5,433,615 A | | 7/1995 | Clark |
| 5,437,554 A | | 8/1995 | Clark et al. |
| 5,458,493 A | | 10/1995 | Clark et al. |
| 5,466,159 A | | 11/1995 | Clark et al. |
| 5,558,521 A | | 9/1996 | Clark et al. |
| 5,658,161 A | | 8/1997 | Roberts et al. |
| 5,672,060 A | | 9/1997 | Poor |
| 5,690,497 A | | 11/1997 | Clark et al. |
| RE36,028 E | | 1/1999 | Deesen et al. |
| 5,978,648 A | | 11/1999 | George et al. |
| 5,987,302 A | * | 11/1999 | Driscoll et al. ......... 434/353 X |
| 5,991,595 A | * | 11/1999 | Romano et al. ........ 434/353 X |
| 6,120,299 A | | 9/2000 | Trenholm et al. |
| 6,173,154 B1 | | 1/2001 | Kucinski et al. |
| 6,267,601 B1 | | 7/2001 | Jongsma et al. |
| 6,295,439 B1 | * | 9/2001 | Bejar et al. ............. 434/350 X |
| 6,493,536 B1 | * | 12/2002 | Jongsma et al. ...... 3434/353 X |

* cited by examiner

*Primary Examiner*—S. Thomas Hughes
*Assistant Examiner*—Chanda L. Harris
(74) *Attorney, Agent, or Firm*—Allen, Dyer, Doppelt, Milbrath & Gilchrist, P.A.

(57) ABSTRACT

A tutorial method for teaching the scoring of open-ended questions holistically includes displaying a student response to a scorer and permitting the scorer to access a rubric containing the rules for scoring that response. The scorer can choose a display form from a handwritten form and a typed text form that retains and originally present errors. Following the scorer's having entered a score, a model score is displayed so that a scoring efficacy may be determined. Annotations prepared by expert scorers may be accessed to enhance the learning process. In addition, a running correlation between the model and entered scores is calculated and displayed for the scorer over a tutorial session that includes attempts at scoring different responses. The system includes a processor, a workstation, and software for performing the above-described method.

11 Claims, 12 Drawing Sheets

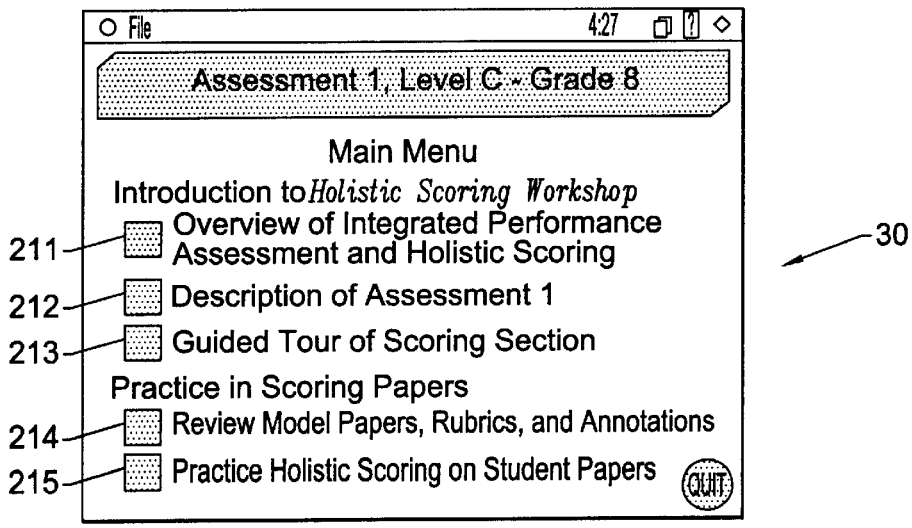

FIG. 3.

Annotation for HIGH Reading Model • Score 6

Judging from the response to Item 1, the story struck an emotional chord in this reader who immediately related the story to a similar personal experience. The student does an excellent job of describing the setting and how it contributes to the mood of the story (see Item 2). The student also seems to capture Ivan's motivation and thinking (see Items 3, 4, and 5). The responses to the poem are thoughtful and reflective. The response to Item 7 represents a plausible connection between the two selections. Overall, this response could be a little stronger, but it is good enough to score a 6.

FIG. 7.

7. Do you think "The Path Through the Cemetery" would have ended differently if the speaker from Angelou's poem had been the one who tried to walk across the cemetery? Justify your answer.

> Probably. It depends if the author of the poem believes in what she's saying. If she believes in what she's saying, then she would have been brave and not imagine things 8. Use these lines to write down any additional thoughts you have about the story and the poem. Tell anything else about your understanding of the selections and what they mean to you.

> Like I said, the story was interesting. I liked the story more than the poem. ~~The~~ Some parts of the poem, I didn't understand, but it was okay.

FIG. 4A.

7. Do you think "The Path Through the Cemetery" would have ended differently if the speaker from Angelou's poem had been the one who tried to walk across the cemetery? Justify your answer.

> Yes, because he would not have been able to tell the audience how he died. It would also tell how he felt when he could not move.

8. Use these lines to write down any additional thoughts you have about the story and the poem. Tell anything else about your understanding of the selections and what they mean to you.

> I thought that The path through the cemetery was ectseptional.

FIG. 4B.

7. Do you think "The Path Through the Cemetery" would have ended differently if the speaker from Angelou's poem had been the one who tried to walk across the cemetery? Justify your answer.

yes. because the speaker would add alot on a put more understanding.

8. Use these lines to write down any additional thoughts you have about the story and the poem. Tell anything else about your understanding of the selections and what they mean to you.

I had alot understanding about the Cemetery because they do have alot of tombs!

FIG. 4C.

7. Yes. because the speaker would add alot on a put more understanding.

8. I had a lot understanding about the cemetery because they do have alot of tombs!

FIG. 4D.

My grandmother when was a little girl she told me the unique story. I thought was true but as I got older I found out it was just a story told by my great great grandfather who is an indian and Irish. I never got to meet him he died many years ago. The closas I have got to him was his gravestone and portraits of him and my grandmother and grandfather I just wish. I now more about him and what he was like to the family. I heard he told so many jokes it was unreal here is one of his jokes "why did the farmer name one pig ink because he kept running out of his pen." I did not think it was very fun but it came from my great great grand father his name was Micheal.

FIG. 5D.

| Assessment 1 • HIGH Writing Model | Rhetorical Effectiveness: Score 5
Conventions: Score 4 |

Time to Write
Write a speech for a banquet honoring an older person you admire. Your audience will be classmates and adults. Your speech shouold let the audience know what you admire about the person. Tell what this person is like by focusing on an incident or incidents in her or his life. Include dialogue, a physical description of the person, any humorous or interesting habits the person has, and a description of the setting and action of the incident(s). Listening to your speech, your audience should be able to picture the person you are writing about. Sum up by telling what you have gained by knowing this person.

I'd like to honor Mr. Sampson for what he has taught and showed me so far this year. Other people think his is "wacko" when he does his humorous acts by impersonating a voice other then his own, but I think he just does that to cheer us up because math is really not the most exciting subject there is.

I remember one time when he was teaching and he tried to change his voice into a surfer type guy, but he didn't sound like one but he sure made us laugh. Sometimes he just acts like a little kid, when he runs in class and takes a nap. I know he likes candy, and he just adores chocolates. He might be a grown man but inside he is like his students.

Mr. Sampson has a blonde beard, I think he grew a beard so it would distract a person from looking at his balding head. He stands about 5'10"

response continues

FIG. 5A.

| Assessment 1 • MEDIUM Writing Model | Rhetorical Effectiveness: Score 3 |
| --- | --- |
| | Conventions: Score 3 |

Time to Write

Write a speech for a banquet honoring an older person you admire. Your audience will be classmates and adults. Your speech shouold let the audience know what you admire about the person. Tell what this person is like by focusing on an incident or incidents in her or his life. Include dialogue, a physical description of the person, any humorous or interesting habits the person has, and a description of the setting and action of the incident(s). Listening to your speech, your audience should be able to picture the person you are writing about. Sum up by telling what you have gained by knowing this person.

From the stories I've been told by my grandma — I think that she's been through some tough times. Especially on her journey to America — she told me about all the things she had to go through: the hiding out from people so her parents, grandparents, and herself wouldn't be seen down in the boat they were hiding out in. On their way over here they had to be surrounded by people dieing (could you imagine, being around someone who had died on a boat that you were on — the smell and decaying of the bodies!) Throughout their boat ride to America they finally succeeded when they reached New York. The feeling that my grandma said she had when she seen the "Statue of response continues

FIG. 5B.

| Assessment 1 • LOW Writing Model | Rhetorical Effectiveness: Score 1
Conventions: Score 2 |

Time to Write

Write a speech for a banquet honoring an older person you admire. Your audience will be classmates and adults. Your speech shouold let the audience know what you admire about the person. Tell what this person is like by focusing on an incident or incidents in her or his life. Include dialogue, a physical description of the person, any humorous or interesting habits the person has, and a description of the setting and action of the incident(s). Listening to your speech, your audience should be able to picture the person you are writing about. Sum up by telling what you have gained by knowing this person.

My grandmother when was a little girl she told me the unique story. I thaight was true but as I got older I found out it was just a story told by my great great grandfather who is an indian and Irish. I never got to meet him he died many years ago. The closes I have got to him was his gravestone and portraits of him and my grandmother and grandfather I just wish. I now more about him and what he was like to the family. I heard he told so many jokes it was unreal here is one of his jokes "why did the farmer name one pig ink because he kept running out of his pen." I did not think it was very fun but it came from my great great grand father his name was Micheal.

FIG. 5C.

COMPUTERIZED SYSTEM AND METHOD FOR TEACHING AND ASSESSING THE HOLISTIC SCORING OF OPEN-ENDED QUESTIONS

CROSS-REFERENCE TO RELATED APPLICATIONS

This application is a continuation of and incorporates by reference application Ser. No. 09/624,444, filed Jul. 24, 2000, now U.S. Pat. No. 6,493,536, which is a continuation of application Ser. No. 08/986,022, filed Dec. 5, 1997, now U.S. Pat. No. 6,267,601, both of which are commonly owned with the present invention and which are incorporated herein by reference.

BACKGROUND OF THE INVENTION

1. Field of the Invention

The present invention relates to systems and methods for teaching scoring and for assessing scoring effectiveness and, more particularly, to such systems and methods for teaching and assessing holistic scoring.

2. Description of Related Art

The automation of test scoring is a complex problem that has generated a great deal of interest, owing to a significant economic pressure to optimize efficiency and accuracy and to minimize human involvement. Open-ended or essay-type questions must typically be scored by a human reader, and thus either the physical test form or a visible image thereof must be available for at least the time required for scoring. In addition, scorers (also referred to as readers or resolvers) must be trained in order to become accomplished in analyzing and scoring the answers to open-ended questions effectively, accurately, and quickly.

Computerized systems for scoring open-ended questions are known in the art. In addition, such systems are known that provide feedback to a scorer on validity, reliability, and speed based upon a standard question and model answer. For example, Clark and Clark et al. (U.S. Pat. Nos. 5,321,611; 5,433,615; 5,437,554; 5,458,493; 5,466,159; and 5,558,521) disclose systems and methods for collaborative scoring, wherein scores of two or more resolvers are compared, and a record is kept of each of the resolver's scores. This group of patents also teach the collection of feedback on a resolver, which includes the monitoring of scoring validity, reliability, and speed. One of the criteria is a calculation of a deviation of the resolver's score and a model score by using "quality items." Also discussed is an online scoring guide for use by the resolver during scoring.

However, there are no systems and methods known in the art that are specifically directed to the teaching of scoring open-ended questions and to providing scoring rules; model answers, scores, and rationales therefor; and feedback to a resolver during the teaching process.

SUMMARY OF THE INVENTION

It is therefore an object of the present invention to provide a system and method for assessing a scorer's grading of an open-ended question.

It is an additional object to provide such a system and method for interactively assisting a scorer in learning a holistic scoring technique.

It is another object to provide such a system and method for tracking a scorer's progress during a practice session.

It is a further object to provide such a system and method for practicing holistic scoring in a variety of content domains such as, but not limited to, reading, writing, science, and mathematics in the same program.

It is yet another object to provide such a system and method for presenting a set of holistic scoring rules, or rubric, to the scorer.

These and other objects are achieved by the system and method of the present invention. One aspect of the method is for teaching a scorer holistically to score an answer to an open-ended question. Holistic scoring is a technique whereby a unitary, typically numerical, score is given for an answer to an open-ended question; for example, in an essay-type response, spelling and grammatical errors and content are all taken into account when granting the score.

The teaching method comprises the step of displaying a student response, which in a particular embodiment may be chosen by the scorer to be presented in handwritten or typed text form, to an open-ended question to a scorer. In a preferred embodiment the scorer is permitted to access for display a scoring rubric for the question, which comprises a set of rules on which the scoring for that question should be based. The scorer then assesses the response and enters a score for the response, which is received by the system. Finally, a model score is presented to the scorer. A comparison of the model score with the scorer's entered score permits him or her to assess his or her scoring efficacy, that is, how close the entered score came to the model score prescribed for the response.

The tutorial software program of the present invention, which may also be referred to simply as a tutorial, in a preferred embodiment comprises a plurality of databases, or, alternatively, a plurality of sectors in a unitary database, containing:

1. A plurality of student responses to an open-ended question. Preferably, each student response is present in an original handwritten image form and in a text form. The text form retains all original errors from the handwritten image.
2. A model score for each student response.
3. A scoring rubric for each question.
4. An analysis of each student response and a rationale for the model score for each student response.

The teaching system of the present invention comprises a computer, or data-processing system, such as, for example, a personal computer or workstation. The computer has resident therein, or has means for communicating with a storage device having resident thereon, a database as described above.

The system also comprises means for displaying a student response to a question to a scorer, means for permitting the scorer to access the scoring rubric for the question, means for receiving a score from the scorer. As described above, these means typically include a personal computer or networked workstation having a keyboard, screen, pointing device, and communication means for accessing a storage device.

Software means are also resident in the computer for presenting on the display means a model score to the scorer to permit the scorer to assess his or her scoring efficacy, that is, how close the assigned score is to the model score. The software means also comprises means for displaying an explanation or annotation of the model score assigned. In addition, means are provided within the processor for tracking the scorer's progress during a practice session with the tutorial. This tracking is preferably accomplished by calculating a running correlation between the model answer and the score entered for each response.

The invention contemplates a system and method for teaching a scorer within a chosen level and discipline. For example, a particular tutorial may comprise a set of questions keyed to a grade level in a particular subject area (e.g., grade 7, history) or in related areas (e.g., grade 8, reading and writing, wherein reading competency is assessed by a student's response to a question on a reading selection, and writing competency is assessed by the student's response to an essay-type question). Alternatively, a set of responses to questions may address the subject matter contained in a professional licensing or qualification examination (e.g., for a laboratory technician).

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 3 illustrates an exemplary opening menu for the tutorial program.

FIG. 4 illustrates a series of exemplary answers to a question on a reading selection, representing (A) a high reading; (B) medium reading; and (C) low reading models for a Grade 8 student. (D) A typed text version of the low reading model of (C).

FIG. 5 illustrates the first pages of a series of exemplary essays on a prescribed topic, representing (A) a high writing; (B) medium writing; and (C) low writing models for a Grade 8 student. (D) A typed text version of the low writing model of (C).

FIG. 7 illustrates a model analysis of a response.

DETAILED DESCRIPTION OF THE PREFERRED EMBODIMENTS

A description of the preferred embodiments of the present invention will now be presented with reference to FIGS. 1–8.

Figure 1:
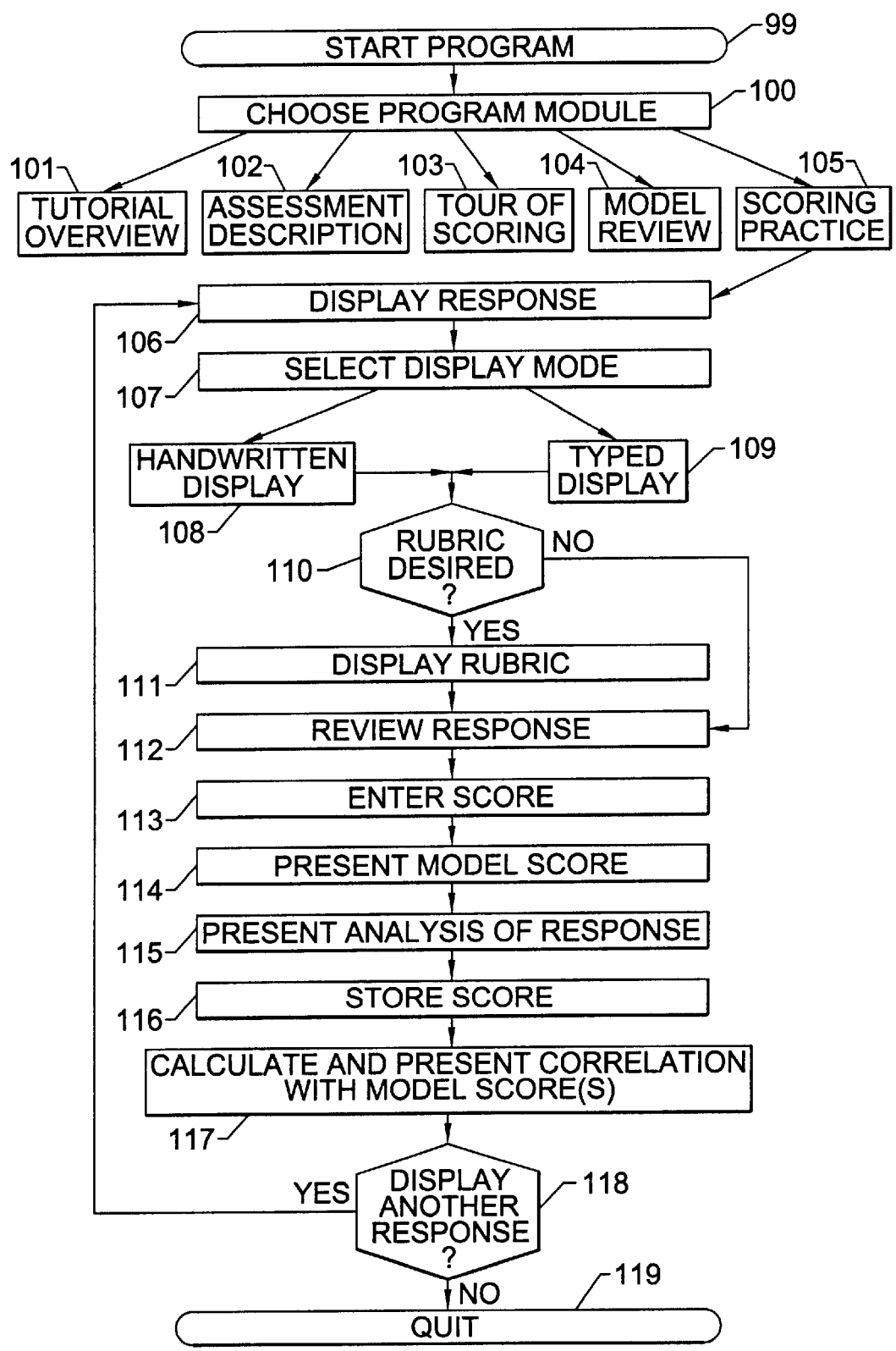
FIG. 1 is a logic flowchart for the method of the present invention for teaching a scorer in a holistic scoring technique.
Figure 2:
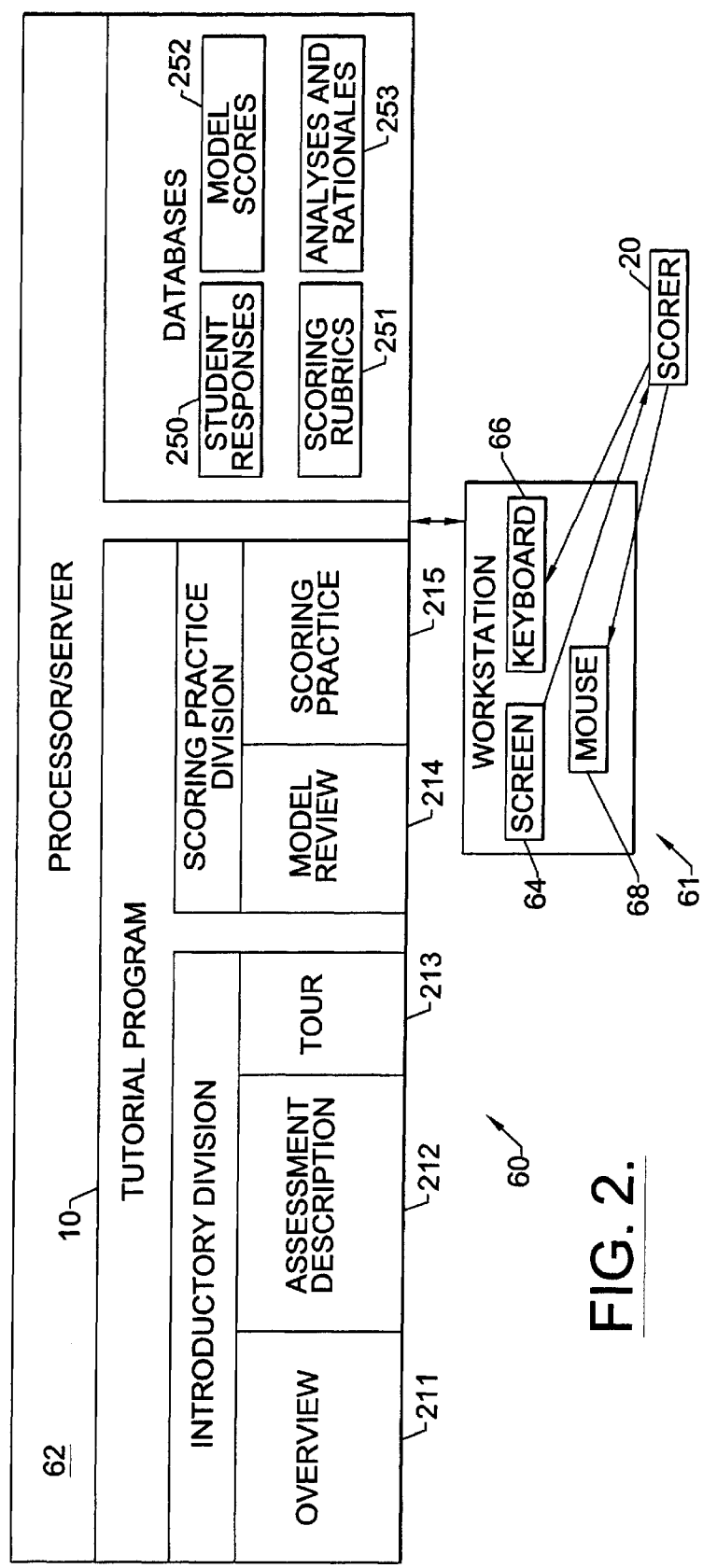
FIG. 2 is a schematic diagram of the system of the present invention.

In a preferred embodiment of the system 60 of the invention, illustrated in FIG. 2, a person 20 desirous of receiving instruction in holistic scoring is provided with access to a processor. The means or access may comprise a personal computer or a workstation 61 or terminal networked to a server computer 62, or an interface to a remote site through telecommunications, internet, or other forms of data transmission, although these architectures are not intended to be limiting. The processor 62 has loaded thereon the tutorial software program 10 of the present invention, which will be described in the following. The computer access/interface is preferably provided by means well known in the art, e.g., via a display screen 64, keyboard 66, and pointing device 68 such as a mouse, for use in a Windows®-type or MACINTOSH environment.

A first aspect of the method (FIG. 1) is for teaching a scorer to holistically score an answer or response to an open-ended question (also referred to as an "assessment" or "assessment form" in the art) via a computer-driven tutorial program 10. The method comprises the steps of starting the tutorial program 10 (Step 99) and providing a choice to the scorer 20 of which section or module of the program 10 to enter (Step 100). In a preferred embodiment this choice is presented in the form of a screen-displayed menu (30, FIG. 3) in a Windows®- or MACINTOSH-type format. This is not intended to be limiting, however, as those skilled in the art will recognize alternate platforms and modes of providing such a selection. In this particular embodiment, two major divisions include introductory (choices 1–3, 211–213) and scoring practice (choices 4 and 5, 214, 215) sections.

A first choice from the menu 30 comprises an overview (211, Step 101) of the tutorial 10, which introduces the scorer 20 to basic principles of integrated performance assessment and holistic scoring. The rationale underlying the development of this form of assessment and a general introduction to holistic scoring are offered.

A second choice from the menu 30 comprises a description of a particular assessment (212, Step 102), including its content, how to prepare for scoring responses, such as reading and writing responses to that assessment, and how to apply the rubrics.

A third choice from the menu 30 comprises a guided tour of the scoring section (213, Step 103). This section provides an annotated screen-by-screen preview of the scoring training program.

The practice division begins with a fourth choice from the menu 30, a review of model papers, rubrics, and annotations (214, Step 104). This section allows the scorer 20 to try out the training program's features before entering the actual scoring module (215, Step 105). Here the scorer can explore the rubrics for selected parameters such as, but not limited to, reading, rhetorical effectiveness, and conventions. The scorer 20 can view model student answers to illustrate, for example, high, medium, and low levels of performance. Exemplary responses are presented in FIGS. 4A–C, which represent high, medium, and low model written responses, respectively, to two questions on a reading selection, and FIGS. 5A–C, which represent the first pages of high, medium, and low model written essays on a prescribed topic. Note that in the case of FIGS. 5A–C, a dual score is given, one for "rhetorical effectiveness" and one for "conventions." In addition, the scorer 20 can read annotations that analyze the answer and explain the scores assigned (FIG. 7).

The final selection offered on the menu 30 comprises the scoring practice module (215, Step 105), in which the scorer 20 can apply what has been learned in the preceding modules 211–214. A plurality of practice answers are provided for each assessment, preferably representing the gamut of "poor" to "excellent" responses.

In the scoring practice module 215 a first student response to an open-ended question is retrieved from a database 250 of student responses and is displayed to the scorer 20 (Step 106). (Here the word student is not intended to be limiting, but should be taken in the broad context of any person taking a test, which could include, for example, a person taking a licensing examination or professional or technical evaluation test.) This step 106 in a preferred embodiment further comprises providing a means for the scorer 20 to select a display mode (Step 107). The display mode can be one of an original handwritten form (Step 108) or a typed (or "keyboarded") text form (Step 109), wherein the typed text form retains all errors in the original handwritten form, such as spelling, grammatical, syntactical, and punctuation mistakes (see, for example, FIGS. 4C,D and 5C,D, which represent the handwritten and typed text versions of the same responses).

Figure 6:
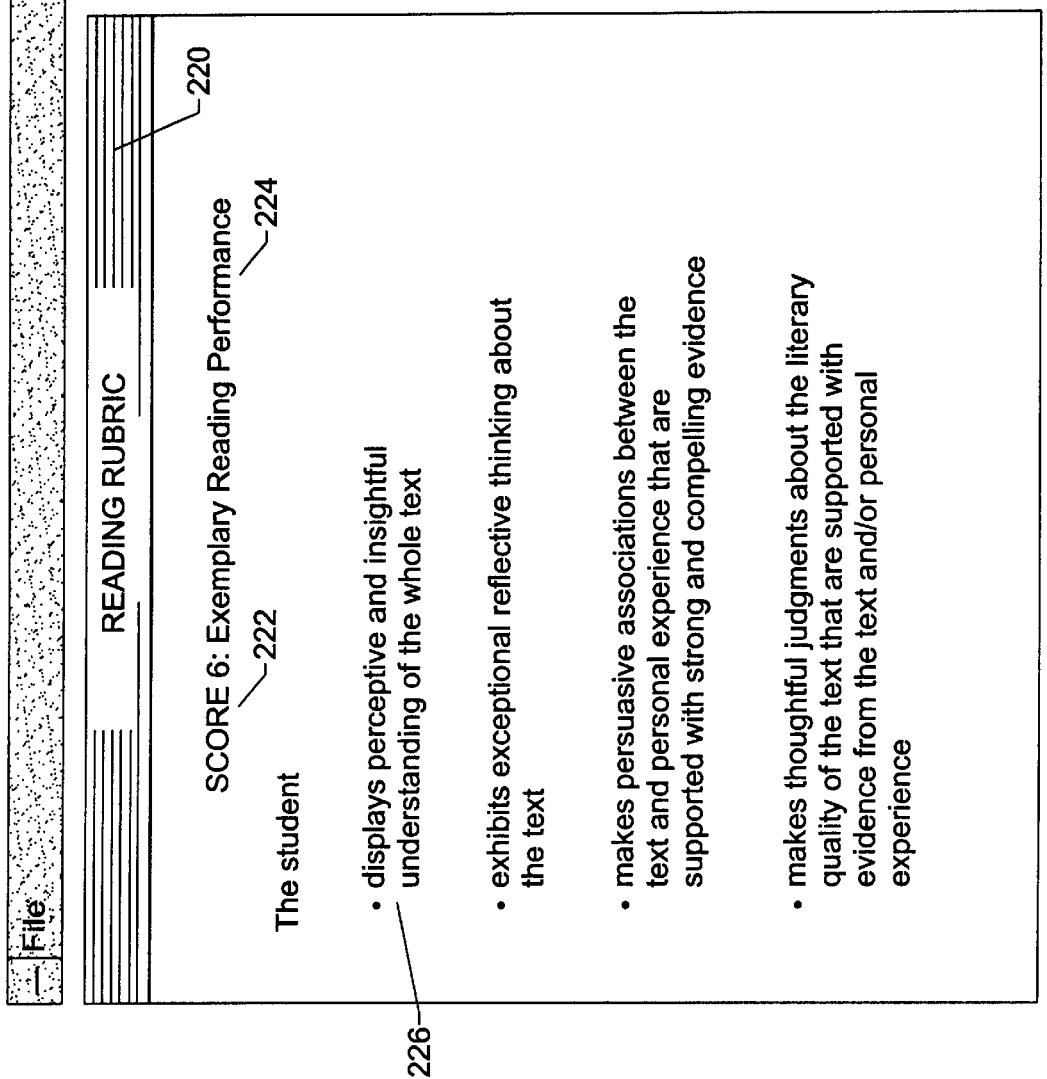
FIG. 6 represents an exemplary screen displaying a scoring rubric for reading.

The scorer 20 is permitted at any time during scoring to access a scoring rubric 220 for the question from a scoring rubric database 251 (FIG. 6, Steps 110, 111). Each rubric contains an indication of what a numerical score 222 represents, including both a brief descriptor (e.g., "exemplary reading performance" 224) and an extensive description of each score point 226 (see FIG. 6). This scoring rubric is typically accessed by the scorer 20 via selecting an icon on the screen 64 with the pointing device 68, although this method is not intended to be limiting.

Once the scorer 20 has reviewed the response (Step 112), a score is entered (Step 113), for example, by selecting a number from a button bar 642 on the screen 64 with the pointing device 68. Such methods of selecting from a variety of options is well known in the art, and other, comparable selection methods may also be envisioned, such as entering a number from the keyboard 66.

Figure 8:
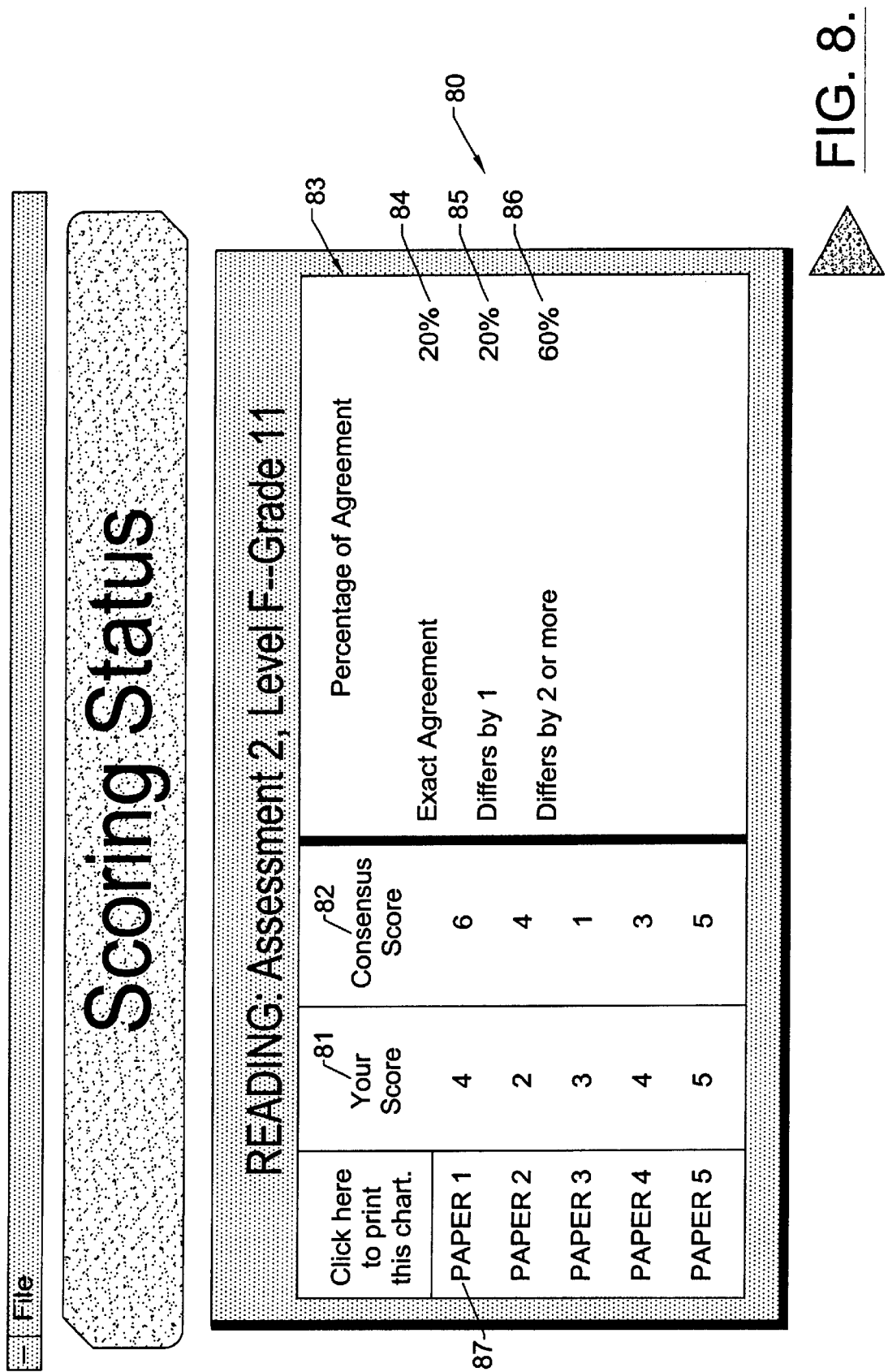
FIG. 8 illustrates a cumulative summary table of a scorer's performance.

When the score has been entered, a model score 228 is retrieved from a database of model scores 252 and is presented to the scorer 20 (Step 114) to permit him or her to assess the scoring efficacy. In addition, an analysis of the answer is retrieved from a database 253 and is presented (Step 115) on the screen 64 to enable the scorer 20 to review his/her score in light of comments of experienced scorers. In the example of FIG. 7, the analysis covers a student's responses to a number of questions on a reading selection, two of which are included in the high reading model of FIG. 4A. The scorer's score is also stored (Step 116), and a correlation is calculated and presented of that score with the model score (FIG. 8 and Step 117).

In order to refine the skills learned thus far, the scorer 20 will typically choose to practice on further assessments (Step 118), and thus preferably a plurality of responses are available for scoring. As an example, a range of responses representing "low" to "high" models, such as the A–C parts of FIGS. 4 and 5, are available, as well as answers to several different assessments, such as represented in FIGS. 4 and 5, which are responses to reading and writing assignments, respectively.

After entering each score and displaying the model score therefor, the scorer 20 is presented with a cumulative summary table 80 (FIG. 8 and Step 117), which updates and displays the percentage of agreement between the scorer's evaluation and that of an experienced scorer. For example, the scoring status screen of FIG. 8 tabulates for each paper 87 a column for "your score" 81 and a column for a model, or "consensus score" 82. Also presented is a table of "percentage of agreement" 83, including a percentage of "exact agreement" 84 with the model score, a percentage of scores that "differ by 1" 85, and a percentage of scores that "differ by 2 or more" 86. This particular arrangement is not intended to be limiting, as one of skill in the art could imagine any number of similar correlation calculations and modes or presentation. The concept of a summary table is intended to provide an indicator of progress in learning the holistic scoring technique.

If the scorer 20 wishes to end the tutorial session (Step 118), the "Quit" button 216 on the menu 30 may be selected (Step 119).

It may be appreciated by one skilled in the art that additional embodiments may be contemplated, including similar methods and systems for training personnel in scoring open-ended questions for other fields.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A computer-readable medium encoded with computer software for teaching a scorer to holistically score an answer to an open-ended question, the computer software comprising:

a first segment of software code for displaying a description to a scorer of principles of holistic scoring; and a second segment of software code for displaying to the scorer a training program comprising:

software code for displaying a model student response to an open-ended question to the scorer;

software code for permitting the scorer to access a scoring rubric for the question;

software code for receiving a score entered by the scorer; and software code for presenting a model score to the scorer to permit the scorer to assess a scoring efficacy based upon a comparison between the entered score and the model score.

2. The computer-readable medium recited in claim 1, wherein the software further comprises:

software code for retrieving from a database the holistic scoring principles description; and software code for retrieving from the database the model student response, the scoring rubric, and the model score.

3. The computer-readable medium recited in claim 1, wherein the computer software further comprises software code for permitting the scorer to select the model student response to be displayed in one of original handwritten form and typed text form, wherein the typed text form retains all original errors present in the original handwritten form.

4. The computer-readable medium recited in claim 1, wherein the computer software further comprises:

software code for iteratively executing the second segment of software code; and software code for calculating a summary correlation between the entered scores and the respective model scores, for providing an indication of scorer progress.

5. A graphical user interface for presentation to a scorer learning to holistically score an answer to an open-ended question comprising:

a first display screen containing means for permitting the scorer to choose among a description of principles of holistic scoring and a practice module;

a second display screen accessible by selecting the practice module from the first display screen, the second display screen containing means for selecting a model answer from among a plurality of model answer levels and a scoring rubric for the selected answer; and a third display screen accessible by selecting an option to practice scoring, the third display screen containing means for selecting a text presentation mode from between an original handwritten form and a typed text form retaining original errors.

6. The graphical user interface recited in claim 5, wherein the first display screen further contains means for selecting the option to practice scoring on model student answers.

7. The graphical user interface recited in claim 6, wherein the third display screen further containing means for selecting to view a model answer, and further comprising a fourth display screen accessible by selecting to view a model answer, the fourth display screen displaying the model answer.

8. The graphical user interface recited in claim 7, wherein the fourth display screen further contains means for selecting to enter a score, and further comprising a fifth display screen accessible by selecting to enter a score containing means for entering a score.

9. The graphical user interface recited in claim 8, further comprising a sixth display screen automatically presented to the scorer upon entering an assigned score, the sixth display screen presenting a comparison between the entered score and a model score, for providing an indication of scoring efficacy.

10. The graphical user interface recited in claim 8, further comprising a seventh display screen accessible following the entering of a plurality of scores, the seventh display screen containing a summary table of the entered scores and the model scores for each answer scored.

11. The graphical user interface recited in claim 10, wherein the seventh display screen further contains a summary percentage of agreement between the entered scores and the model scores for all the answers scored.

\* \* \* \* \*